United States Patent

Brutlag

[11] 4,119,250
[45] Oct. 10, 1978

[54] MATTRESS CARRYING DEVICE

[75] Inventor: Minehart Brutlag, Albuquerque, N. Mex.

[73] Assignee: The Raymond Lee Organization, Inc., New York, N.Y.; a part interest

[21] Appl. No.: 827,971

[22] Filed: Aug. 26, 1977

[51] Int. Cl.² .................................... B65D 71/00
[52] U.S. Cl. ............................ 224/49; 5/317 R; 16/DIG. 28; 294/67 D
[58] Field of Search ............... 224/49, 55, 58, 45 F, 224/45 D, 45 H, 47; 5/317 R, 324, 322; 211/28, 41; 248/310, 309 R; 294/67 R, 67 D, 67 DB, 32; 206/449; 16/124, 125, DIG. 28

[56] References Cited

U.S. PATENT DOCUMENTS

| 2,784,890 | 3/1957 | Chisholm | 224/45 H |
| 3,315,857 | 4/1967 | Eclou | 224/45 H |

FOREIGN PATENT DOCUMENTS 1,919,916  5/1970  Fed. Rep. of Germany ............ 224/49

Primary Examiner—Trygve M. Blix
Assistant Examiner—Kenneth W. Noland
Attorney, Agent, or Firm—Daniel Jay Tick

[57] ABSTRACT

Heavy cloth-like material is shaped as a rectangular parallelepiped and has sides or ends having a length corresponding to the length of a king-sized mattress and a bottom having a width corresponding to the thickness of a king-sized mattress. A pair of carrying straps of endless square 0 configuration are affixed to the bottom of the material and to the sides at corresponding opposite ends of the parallelepiped. The straps extend in loops from the opposite ends of the parallelepiped at angles with the bottom, whereby two people, each holding the extending part of a corresponding one of the straps, support and carry a mattress placed in the material and resting on the bottom thereof.

1 Claim, 4 Drawing Figures

MATTRESS CARRYING DEVICE

BACKGROUND OF THE INVENTION

The present invention relates to a mattress carrying device.

Objects of the invention are to provide a mattress carrying device of simple structure, which is inexpensive in manufacture, used with facility and convenience, and functions efficiently, effectively and reliably to permit two people to carry any sized mattress without soiling of or damage to such mattress.

BRIEF DESCRIPTION OF THE DRAWINGS

In order that the invention may be readily carried into effect, it will now be described with reference to the accompanying drawings, wherein.

DETAILED DESCRIPTION OF THE INVENTION

The mattress carrying device of the invention comprises a heavy cloth-like material of any suitable type such as, for example, canvas, shaped as a substantially rectangular parallelepiped having a first pair of spaced substantially parallel ends 1 and 2 and a second pair of spaced substantially parallel sides 3 and 4 (FIGS. 1 and 2) substantialy perpendicular to the first pair of sides and joining said first pair of sides.

Figure 1:
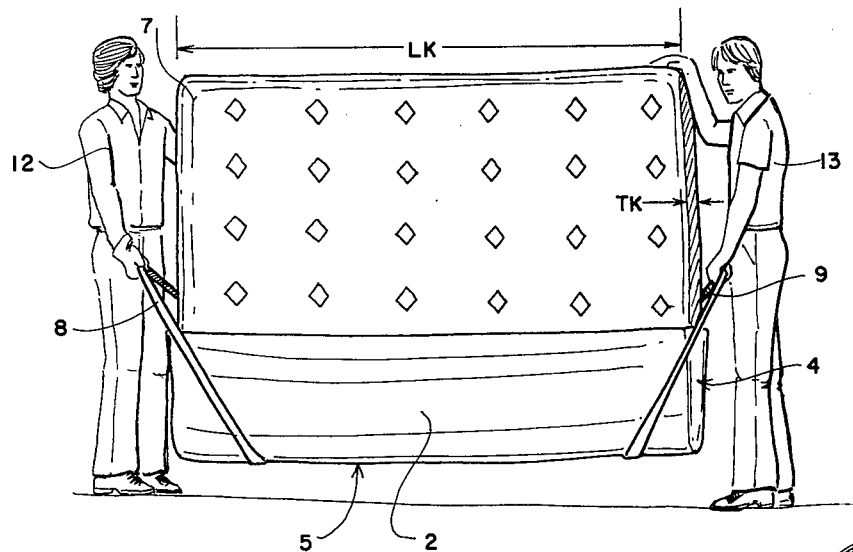
FIG. 1 is a view of an embodiment of the mattress carrying device of the invention in use.
Figure 2:
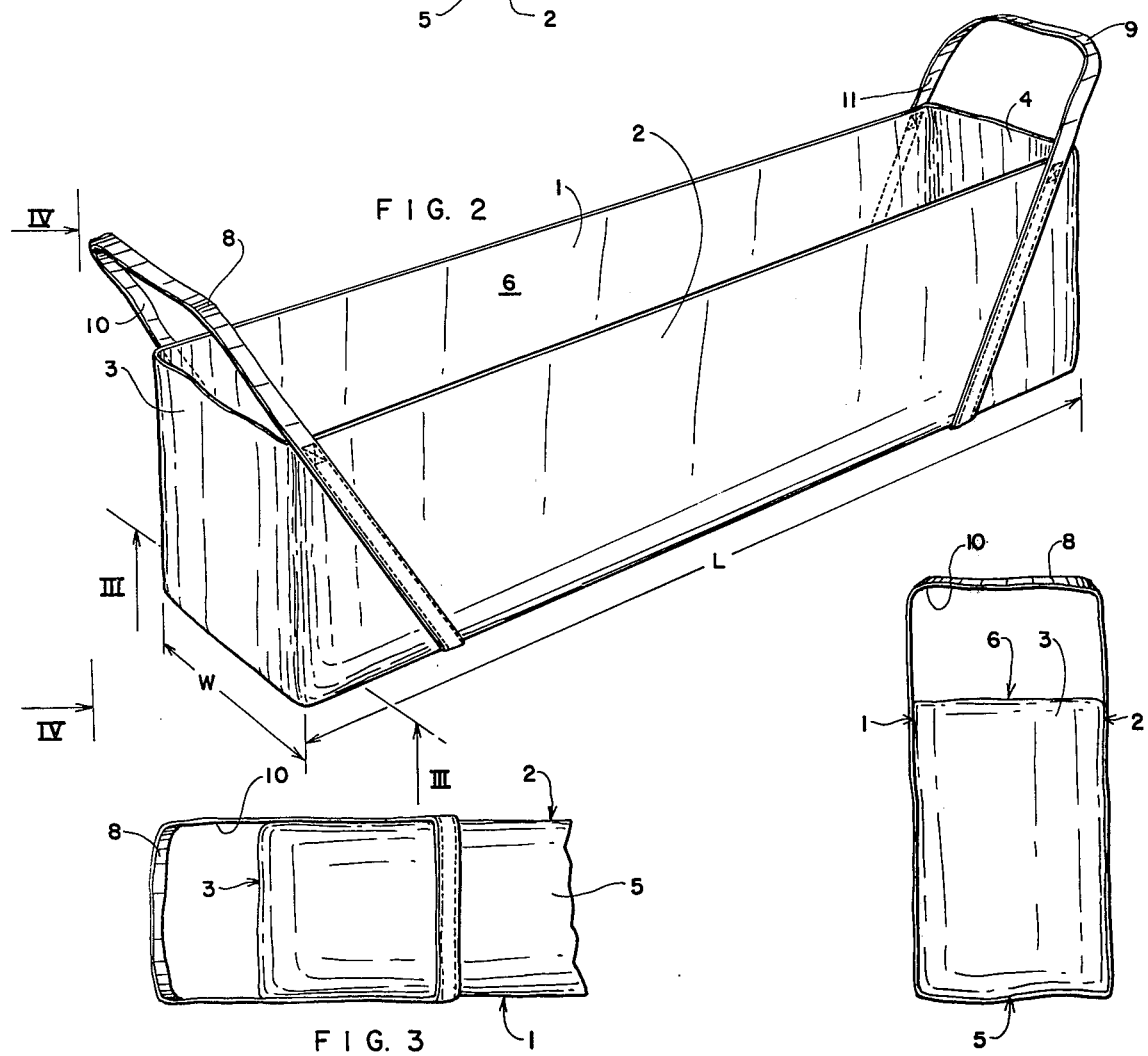
FIG. 2 is a perspective view, on an enlarged scale, of the embodiment of FIG. 1 of the mattress carrying device of the invention.
Figure 3:
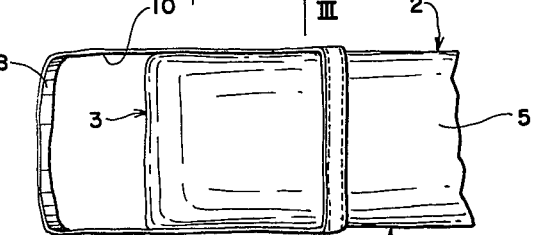
FIG. 3 is a bottom view, taken along the lines III—III, of FIG. 2.
Figure 4:
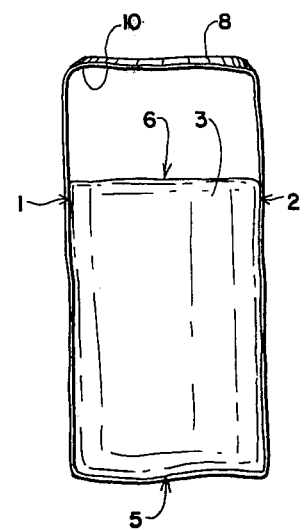
FIG. 4 is an end view, taken along the lines IV—IV, of FIG. 2.

The material also has a bottom 5 (FIGS. 1, 3 and 4) substantially perpendicular to the sides and ends 1, 2, 3 and 4 and joining them, and an open top 6 (FIGS. 2 and 4).

The first sides 1 and 2 of the material, or more particularly of the rectangular parallelepiped configuration formed by the material, and the bottom 5 of said material have a length L (FIG. 2) corresponding to the length LK of a king-sized mattress 7 (FIG. 1). The second ends 3 and 4 and the bottom 5 of the material, or more particularly, of the rectangular parallelepiped formed by the material, have a width W (FIG. 2) corresponding to the thickness TK of a king-sized mattress 7 (FIG. 1). The carrying device of the invention may thus carry any size mattress with facility and convenience.

A pair of carrying straps 8 and 9 are provided, as shown in FIGS. 1 and 2. Each of the carrying straps 8 and 9 comprises an endless strap of substantially square 0 configuration affixed to the bottom 5 of the material in spaced parallel relation with the second ends 3 and 4, respectively, as shown in FIGS. 1 and 2, at the opposite ends of the parallelepiped. The straps 8 and 9 may comprise the same cloth-like material such as, for example, canvas, as the remainder of the carrying device.

The strap 8 is affixed to both of the first sides 1 and 2 and extends at an angle with the corresponding second end 3, so that said strap is affixed to the material at the junction of said first sides and the open top 6 of the material and extends in a loop 10 (FIGS. 2 to 4) beyond said corresponding second end and said top, at an angle with said corresponding second end and the bottom 5.

The strap 9 is affixed to the first sides 1 and 2 and extends at an angle with the corresponding second end 4, as shown in FIG. 2, so that said strap is affixed to the material at the junction of said first sides and the open top 6 of the material at the opposite end of the parallelepiped and extends in a loop 11 (FIG. 2) beyond said corresponding second end and said top, at an angle with said corresponding second end and the bottom 5.

Thus, two people 12 and 13, holding the extending part or loop of the straps 8 and 9, respectively, support and carry the mattress 7 placed in the material and resting on the bottom thereof.

While the invention has been described by means of a specific example and in a specific embodiment, I do not wish to be limited thereto, for obvious modifications will occur to those skilled in the art without departing from the spirit and scope of the invention.

Carrying devices of the type described in the present application are disclosed in the following U.S. Pats: No. 2,397,433, issued to Reeves on Mar. 26, 1946; No. 2,399,786, issued to Caton on May 7, 1946; No. 2,427,246, issued to Whittington on Sept. 9, 1947; No. 2,931,055, issued to Sostrin on Apr. 5, 1960; No. 3,056,245, issued to Baum et al on Oct. 2, 1962; No. 3,167,227, issued to Walden, Sr. on Jan. 26, 1965; No. 3,273,177, issued to Newton on Sept. 20, 1966; No. 3,286,284, issued to Klogether et al on Nov. 22, 1966; No. 3,317,933, issued to Meyer et al on May 9, 1967; No. 3,454,969, issued to Lundberg on July 15, 1969; No. 3,481,519, issued to Snetselaar on Dec. 2, 1969 and No. 3,792,806, issued to Layton on Feb. 19, 1974.

I claim:

1. A mattress carrying device, comprising heavy cloth-like material shaped as a substantially rectangular parallelepiped having a first pair of spaced substantially parallel sides, a second pair of spaced substantially parallel ends substantially perpendicular to the first pair of sides and joining the first pair of sides, a bottom substantially perpendicular to the sides and ends and joining them and an open top, the first sides and the bottom having a length corresponding to the length of a king-sized mattress and the second ends and the bottom having a width corresponding to the thickness of a king-sized mattress; and a pair of carrying straps, each comprising an endless strap of substantially square 0 configuration affixed to the bottom of the material in spaced parallel relation with a corresponding one of the second ends, each of the straps also being affixed to both of the first sides and extending at an angle towards the corresponding second ends so that the strap is affixed to the material at the junction of the first sides and second ends and the open top of the material and extends in a loop beyond and outward of the corresponding second ends and the top whereby two people each holding the extending part of a corresponding one of the straps support and carry a mattress placed in the material and resting on the bottom thereof.

* * * * *